United States Patent [19]
Vild et al.

[11] Patent Number: 6,038,887
[45] Date of Patent: Mar. 21, 2000

[54] APPARATUS AND METHOD FOR FORMING GLASS SHEETS

[75] Inventors: Michael J. Vild, Toledo; Paul D. Ducat, Perrysburg, both of Ohio

[73] Assignee: Glasstech, Inc., Perrysburg, Ohio

[21] Appl. No.: 09/136,641

[22] Filed: Aug. 19, 1998

[51] Int. Cl.[7] .......................... C03B 21/00; C03B 23/00; C03B 23/02; C03B 11/00; C03B 29/00

[52] U.S. Cl. ............................ 65/273; 65/106; 65/182.2; 65/287; 65/305; 425/436 R; 425/441; 425/443

[58] Field of Search .............................. 65/106, 273, 287, 65/305, 182.2; 425/436 R, 437, 441, 443

[56] References Cited

U.S. PATENT DOCUMENTS

| | | |
|---|---|---|
| 4,578,103 | 3/1986 | Fackelman . |
| 4,615,724 | 10/1986 | Fackelman . |
| 5,002,599 | 3/1991 | McMaster et al. . |
| 5,004,491 | 4/1991 | McMaster et al. . |
| 5,401,286 | 3/1995 | Goolsbay et al. ..................... 65/106 |
| 5,681,595 | 10/1997 | Travaglini .......................... 425/436 R |
| 5,906,668 | 5/1999 | Mumford et al. ..................... 65/287 |

*Primary Examiner*—Stanley S. Silverman
*Assistant Examiner*—Jacqueline A Ruller
*Attorney, Agent, or Firm*—Brooks & Kushman P.C.

[57] ABSTRACT

Apparatus and a method for forming glass sheets includes a topside transfer platen (44) that releases a heated glass sheet onto a mold supported in an upper position by a mold support frame assembly (62) which then moves the mold vertically downward and rotationally to a lower position for movement horizontally on a track (66) from below the topside transfer platen for continuation of the forming. The apparatus includes an elevator mechanism (84) having a pair of elevators (86) and an associated pair of actuators (88) that are movable different extents in order to provide the vertical and rotational movement of the mold frame support assembly (62).

15 Claims, 9 Drawing Sheets

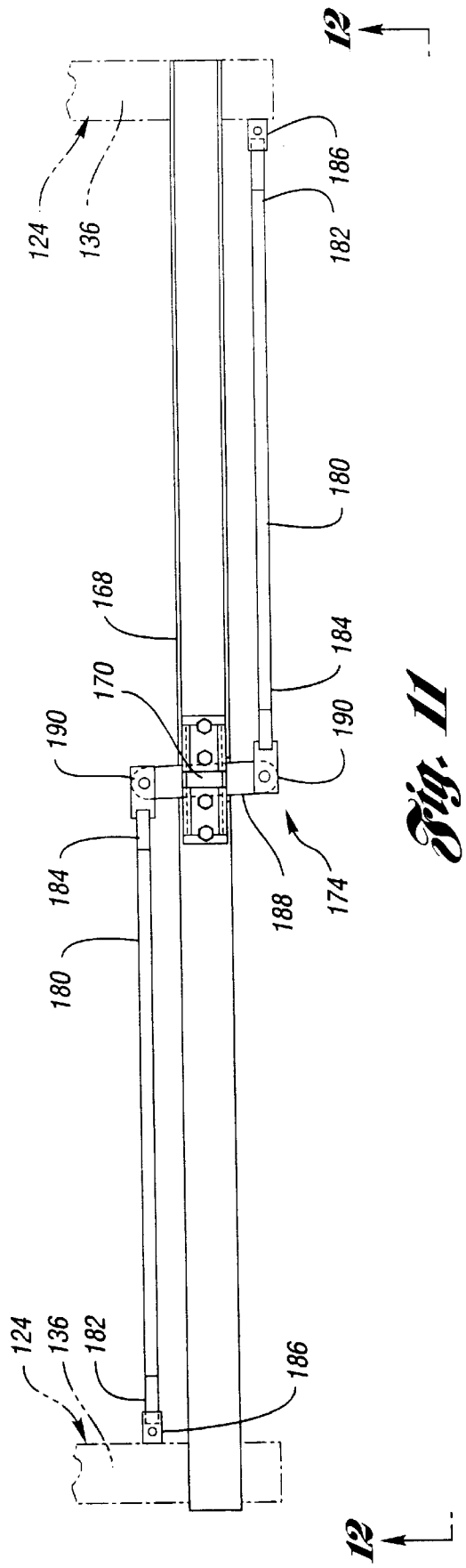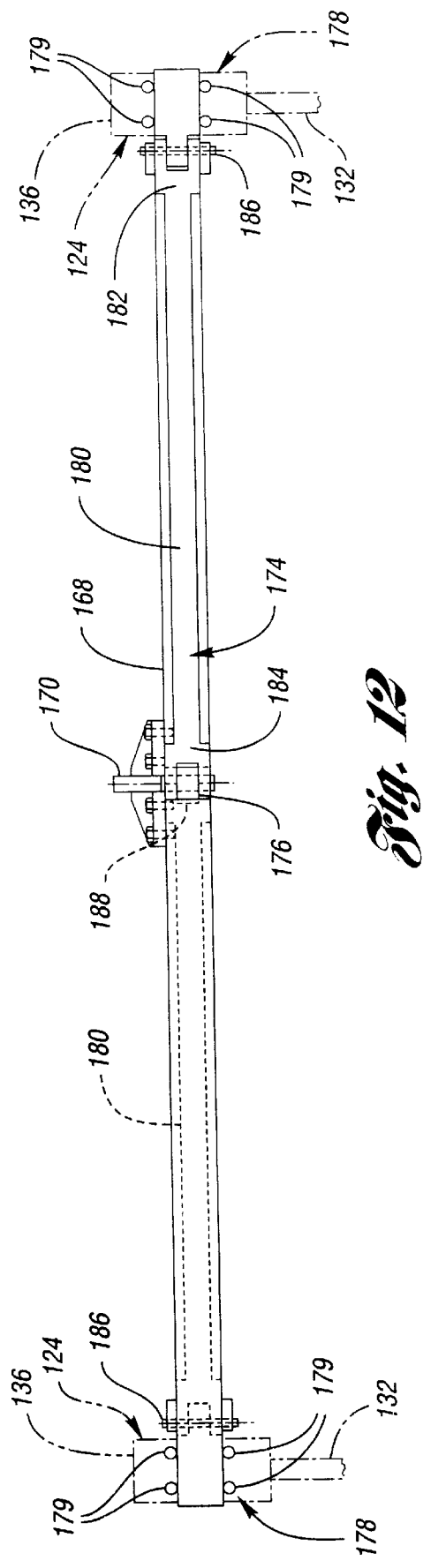

APPARATUS AND METHOD FOR FORMING GLASS SHEETS

TECHNICAL FIELD

This invention relates to apparatus and a method for forming glass sheets.

BACKGROUND ART

One type of glass sheet forming as disclosed by U.S. Pat. No. 4,578,103 Fackleman; U.S. Pat. No. 4,615,724 Fackleman; U.S. Pat. No. 5,002,599 McMaster et al.; and U.S. Pat. No. 5,004,491 McMaster et al. involves releasing a heated glass sheet from a topside transfer platen onto a mold for forming. With this type of forming in order to have the minimum drop distance, the orientation of the glass sheet on the mold is controlled by the orientation of the downwardly facing topside transfer platen which is conventionally inclined to receive the glass sheet from a heating conveyor. Thus, the continued processing of the glass sheet on the mold is controlled by the orientation of the mold upon release, and this orientation controls the orientation of the processing throughout the entire forming process even upon eventual cooling when it may be desirable to have a different orientation to permit location of the formed glass sheet between closely spaced quench units of a cooling station.

Accurate forming of heated glass sheets requires that the molds utilized to perform the forming be properly located despite the thermal expansion that takes place when the system involved is heated to a glass forming temperature. One way in which proper positioning of molds has previously been provided is by readjusting the mold position during each cycle through alignment devices such as disclosed by U.S. Pat. No. 5,092,916 McMaster. Another way in which mold positioning has been achieved is by use of positioning devices including sinter-bonded fused silica positioners that have a very low rate of thermal expansion so as to thereby maintain proper positioning of locators that provide the mold positioning such as disclosed by U.S. Pat. No. 5,230,728 McMaster.

DISCLOSURE OF INVENTION

One object of the present invention is to provide improved apparatus for forming glass sheets.

In carrying out the above object, the glass sheet forming apparatus of the invention includes a topside transfer platen having a downwardly facing surface for receiving a heated glass sheet to be formed. A mold support frame assembly of the apparatus supports a mold for translational and rotational movement between an upper position adjacent the downwardly facing surface of the topside transfer platen to receive the heated glass sheet therefrom for forming and a lower position where the glass sheet is positioned below the topside transfer platen and has a different orientation due to the rotational component of the movement. A track of the apparatus supports the mold support frame assembly for horizontal movement to and from the lower position below the topside transfer platen.

In the preferred construction of the apparatus, the mold support frame assembly moves the mold vertically and rotatively between the upper position and the lower position which is substantially directly below the upper position. An elevator mechanism of the apparatus preferably moves the mold support assembly vertically and rotatively between the upper and lower positions. This elevator mechanism includes a pair of elevators that move the mold support frame assembly vertically, and a pair of actuators of the apparatus respectively operate the pair of elevators to provide vertical movement thereof for different extents in order to provide the vertical and rotational movement of the mold support frame assembly. A pair of crank arm linkages of the apparatus respectively connect the pair of actuators to the pair of elevators to provide the vertical movement thereof that moves the mold support frame assembly. Rollers of the apparatus support the mold support frame assembly on the pair of elevators.

The apparatus preferably includes a pair of carriages and a pair of pivotal mounts respectively supported by the pair of carriages. The pair of pivotal mounts each have a slide connection to the mold support frame assembly in order to permit the vertical and rotational movement under the operation of the pair of actuators operating the pair of elevators of the elevator mechanism. In addition, the preferred construction of the apparatus includes a pair of track members that support the pair of carriages for horizontal movement to and from the lower position below the topside transfer platen. A drive member of the apparatus is movable along the track and has a connection to one of the carriages for providing movement thereof and of the mold support frame assembly horizontally along the track.

Another object of the present invention is to provide an improved method for transferring a hot glass sheet during a forming operation.

In carrying out the above object, the method of the invention is performed by releasing a hot glass sheet from a downwardly facing topside transfer platen onto a mold positioned in an upper position adjacent the topside transfer platen. The mold is moved downwardly by translational and rotational movement to a lower position below the topside transfer platen where the hot glass sheet has a different orientation due to the rotational component of the movement. Thereafter, the mold is moved horizontally from the lower position below the topside transfer platen for continuation of the forming operation.

In the preferred practice of the method, the mold is initially moved horizontally to the lower position below the topside transfer platen and is then moved upwardly by translational and rotational movement to the upper position to receive the hot glass sheet from the topside transfer platen. The mold is preferably supported on a track by a mold support frame assembly for the horizontal movement to and from the lower position below the topside transfer platen.

The objects, features, and advantages of the present invention are readily apparent from the following detailed description of the best mode for carrying out the invention when taken in connection with the accompanying drawings.

BRIEF DESCRIPTION OF DRAWINGS

FIG. 11 is taken along the direction of line 11—11 in FIG. 2 to further illustrate the construction of the mold support frame assembly and the second linkage.

FIG. 12 is an elevational view taken along the direction of line 12—12 in FIG. 11 to further illustrate the construction of the mold support frame assembly.

BEST MODE FOR CARRYING OUT THE INVENTION

Figure 1:
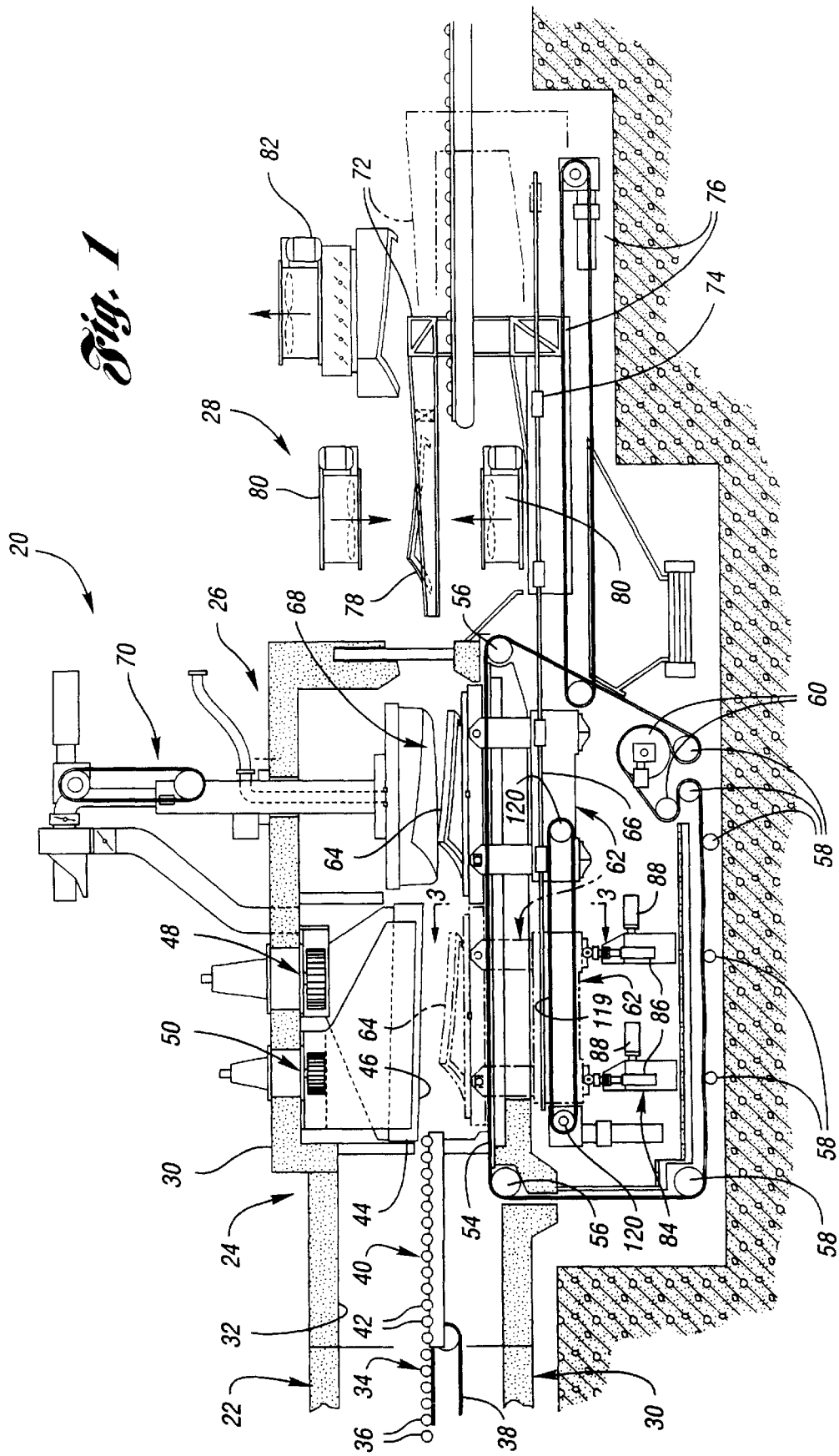
FIG. 1 is a side elevational view illustrating a glass sheet forming system that incorporates the present invention.

With reference to FIG. 1, a glass sheet forming and cooling system embodying the invention is generally indicated by 20 and includes a heating furnace 22 for heating glass sheets to be formed, a transfer station 24, a forming station 26 that receives the heated glass sheets from the transfer station 24 for forming, and a cooling station 28 for cooling the glass sheets to provide annealing, heat strengthening or tempering.

With continuing reference to FIG. 1, the system 20 includes an insulated housing 30 for the heating furnace 22, transfer station 24 and the bending station 26. This insulated housing defines a heated chamber 32 through which the glass sheets are moved during the heating, transferring and forming as is hereinafter more fully described.

Heating furnace 22 includes a heating conveyor 34 which is illustrated as being of the roll type including rolls 36 that are rotatively driven by a continuous loop drive member 38. The transfer station 24 also includes a conveyor 40 that is illustrated as being of the roll type including rolls 42 that rotatively transfer the heated glass sheets from the heating furnace 22 to the bending station 26. To the right of the transfer station conveyor 40, a topside transfer platen 44 is positioned within the heated chamber 32 defined by the system housing 30. This topside transfer platen, as illustrated also in FIGS. 5 and 6, has a downwardly facing surface 46 for supporting a heated glass sheet G to be formed. The preferred manner in which the heated glass sheet is supported is without any direct contact with the downwardly facing surface 46, which is accomplished by drawing a vacuum through a first set of holes in the surface by a vacuum blower 48 illustrated in FIG. 1, and by also supplying pressurized gas to a second set of holes in the downwardly facing surface by a forced air blower 50. Thus, the heated glass sheet is supported without any direct contact. To facilitate the transfer of the heated glass sheet from the transfer conveyor 40, the downwardly facing surface 46 will normally be inclined downwardly toward the right and may include suitable glass sheet positioners such as illustrated by 52 in FIGS. 5 and 6.

As illustrated in FIG. 1, the system 20 includes a cullet belt 54 that extends over upper rolls 56 so as to carry any broken glass as cullets out of the bending station for disposal. This cullet belt 54 also extends over lower rolls 58 as well as over drive and tensioning rolls 60 that provide the driving of the cullet belt while maintaining a proper tension.

Figure 5:
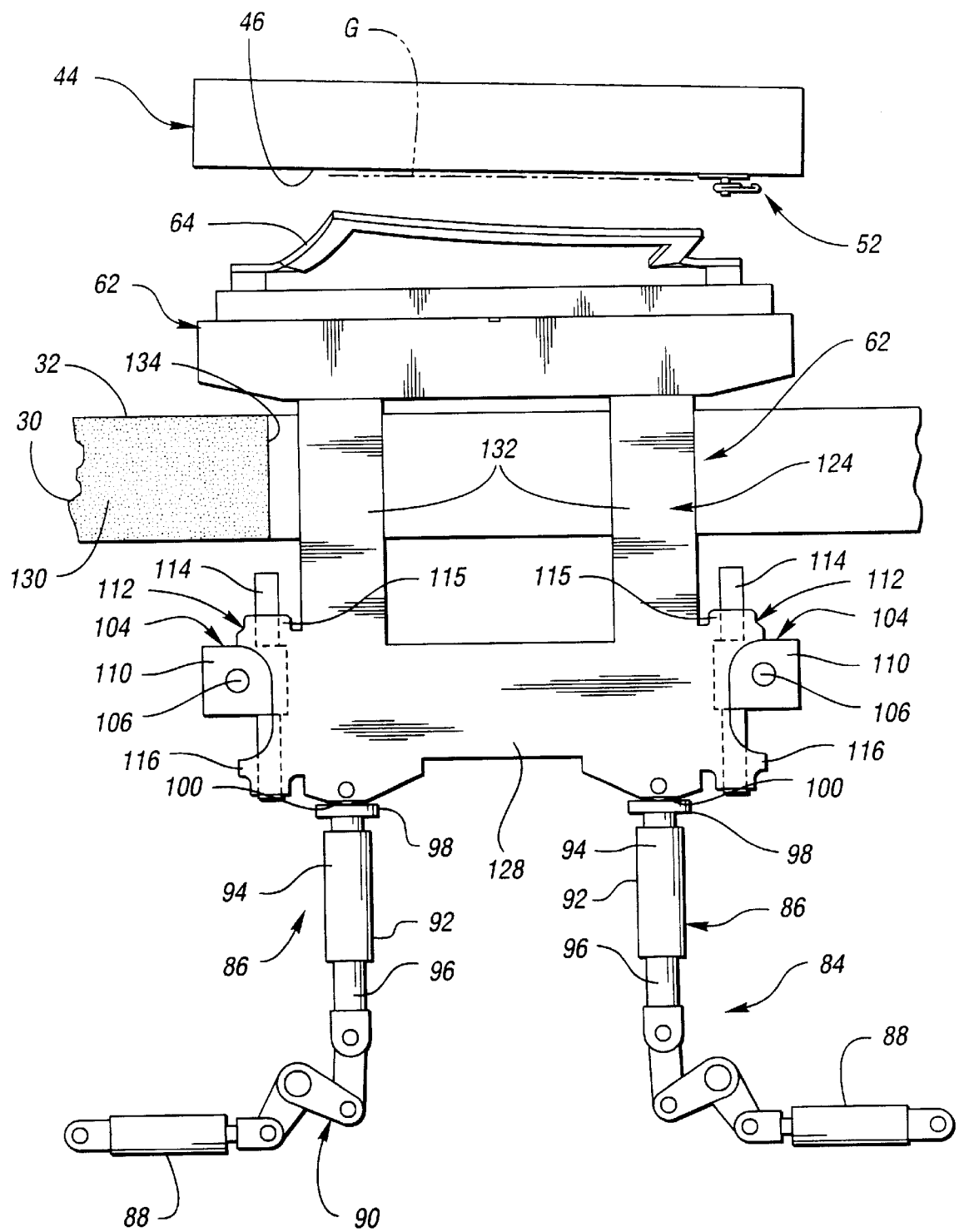
FIG. 5 is a view taken in the same direction as FIG. 1 and illustrating the mold frame support assembly with a mold located in a lower position below a topside support platen.
Figure 6:
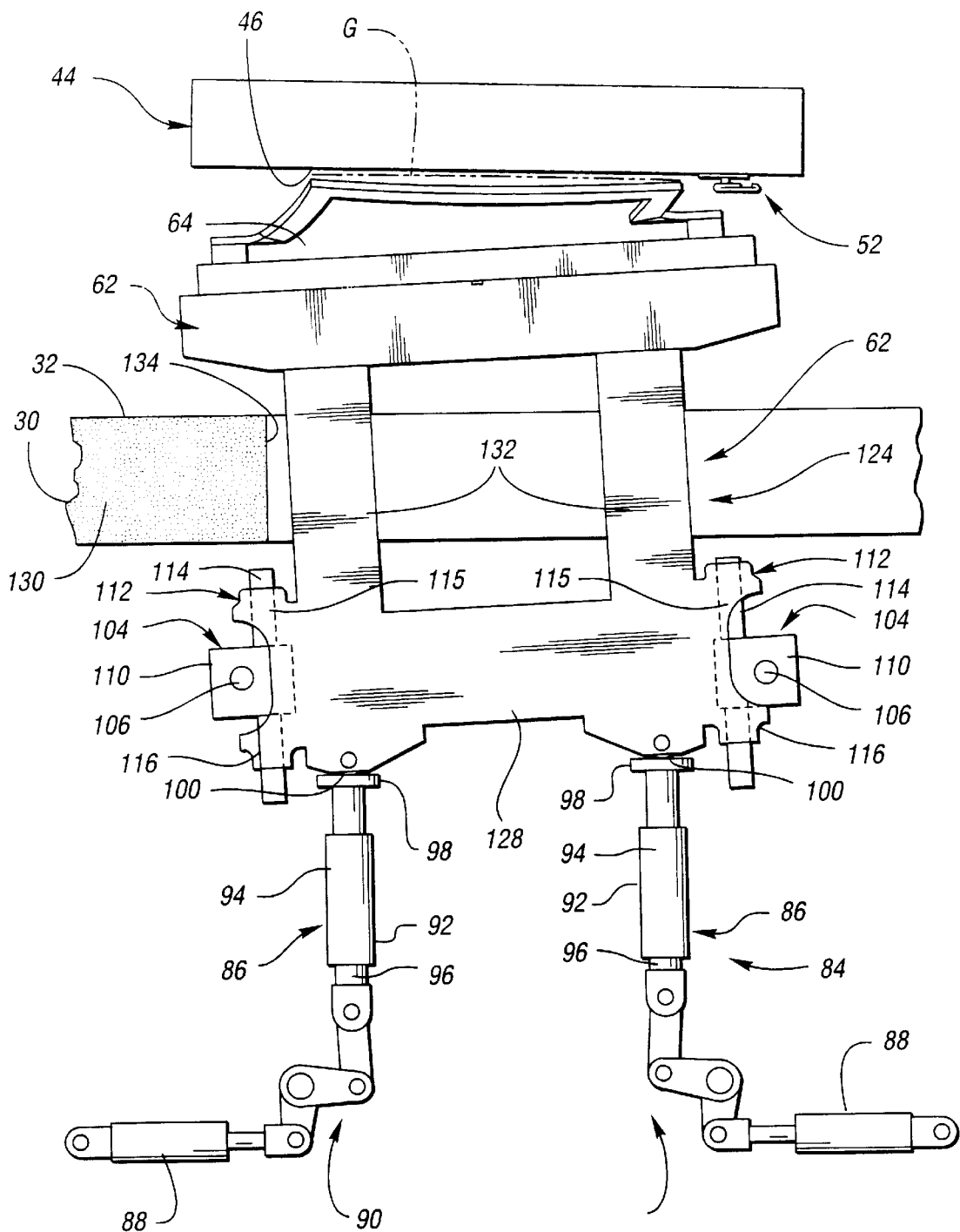
FIG. 6 is an elevational view similar to FIG. 5 but illustrating the mold support frame assembly moved upwardly and rotatively to an upper position adjacent the topside support platen to receive a heated glass sheet therefrom prior to downward movement for continuation of the processing.

With combined reference to FIGS. 1, 2, 5 and 6, the bending station 26 includes a mold support frame assembly generally indicated by 62 for supporting a mold 64. This mold support frame assembly 62 supports the mold 64 for translational and rotational movement between an upper position adjacent the downwardly facing surface 46 of the topside transfer platen 44 as illustrated in FIG. 6 to receive a heated glass sheet G therefrom for forming and a lower position as shown in FIGS. 1 and 5 where the glass sheet has a different orientation due to the rotational component of the movement.

Figure 2:
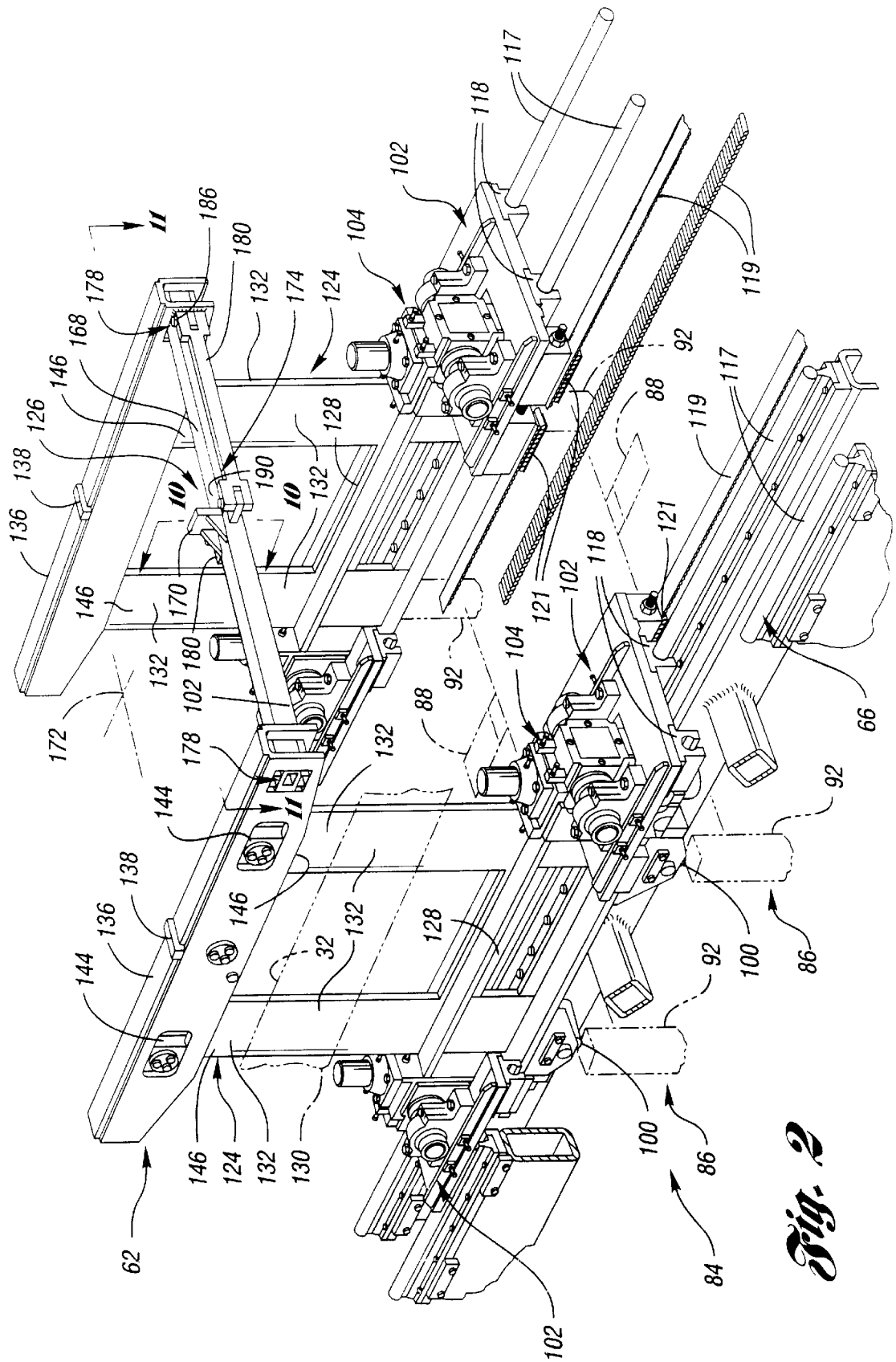
FIG. 2 is a perspective view illustrating a mold support frame assembly that embodies the invention.
Figure 3:
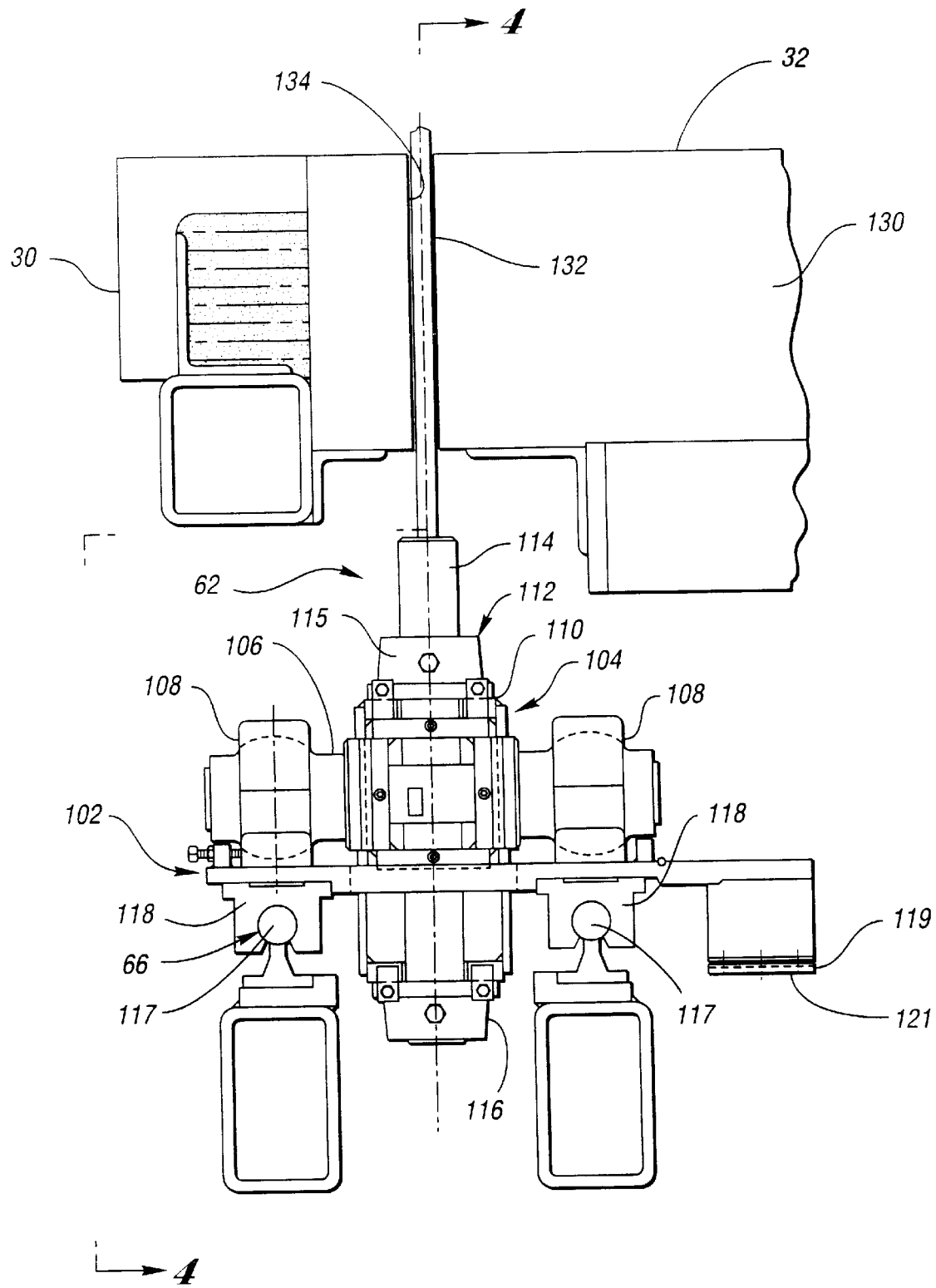
FIG. 3 is an elevational view taken along the direction of line 3—3 in FIG. 1 to further illustrate the mold support frame assembly.

As illustrated in FIGS. 1, 2 and 3, a track generally indicated by 66 supports the mold support frame assembly 62 for horizontal movement to and from the lower position below the topside transfer platen 44 as shown by phantom line representation in FIG. 1 as well as being shown in FIG. 5. Each cycle of the forming operation begins with the mold support frame assembly 62 in its solid line position of FIG. 1 and proceeds by movement thereof to the left to the phantom line indicated lower position below the topside transfer platen 44. Upward and rotational movement of the mold support frame assembly then moves the mold 64 to the upper position illustrated in FIG. 6 as previously discussed. After receiving the glass sheet G from the topside transfer platen, the mold 64 is moved downwardly and rotated into the lower position with the glass sheet thereon prior to horizontal movement on the track 66 back to the solid line indicated position of FIG. 1. A second mold 68 of the bending station 26 is then moved downwardly to cooperate with the mold 64 in providing press bending of the glass sheet. A vacuum supplied to the mold 68 and vertical movement thereof by an actuator 70 then lifts the glass sheet upwardly from the mold 64 in order to commence the next cycle of the bending.

With continuing reference to FIG. 1, the cooling station 28 includes a shuttle 72 that is movable along a track 74 under the operation of a drive mechanism 76 to move a cooling ring 78 below the second mold 68 whose vacuum is then terminated so as to release the formed glass sheet onto the cooling ring. Movement of the carriage 72 back toward the right then moves the cooling ring 78 with the formed glass sheet thereon to the cooling station 28 between a pair of cooling blowers 80 in order to provide annealing, heat strengthening or tempering. After the cooling, the carriage 72 is moved farther toward the right to an unload area 82 that lifts the formed glass sheet upwardly by a fan for unloading.

As best illustrated by FIGS. 5 and 6, the mold support frame assembly 62 moves the mold 64 vertically and rotatively between the upper position shown in FIG. 6 and the lower position which as shown in FIG. 5 is substantially directly below the upper position, and this movement is provided by an elevator mechanism 84 that is also schematically illustrated in FIG. 2. This elevator mechanism 84, with continuing reference to FIG. 2, includes a pair of elevators 86 that move the mold support frame assembly vertically and also includes a pair of actuators 88 that respectively operate the pair of elevators to provide vertical movement thereof for different extents in order to provide the vertical and rotational movement of the mold support frame assembly 62. A pair of crank arm linkages 90 as shown in FIGS. 5 and 6 respectively connect the pair of actuators 88 to the pair of elevators 86 to provide the vertical movement thereof that moves the mold support frame assembly 62. Each of the actuators 88 is constructed as a retractable and extendable cylinder whose extension rotates the associated crank arm linkage 90 to move the connected elevator 86 vertically either upwardly or downwardly. Furthermore, each of the pair of elevators 86 actually includes an elevator unit 92 at each lateral side of the system as schematically illustrated in FIG. 2. Each of these elevator units 92 as shown in FIGS. 5 and 6 includes a stationary support 94 and an elevator member 96 mounted by the associated stationary support for vertical movement and having an upper end 98 on which the adjacent corner of the mold support frame assembly 62 is supported. More specifically, rollers 100 support the mold support frame assembly 62 on the pair of elevators 86 in a manner that permits movement to the right and left to accommodate for its rotation as is hereinafter more fully described.

Figure 4:
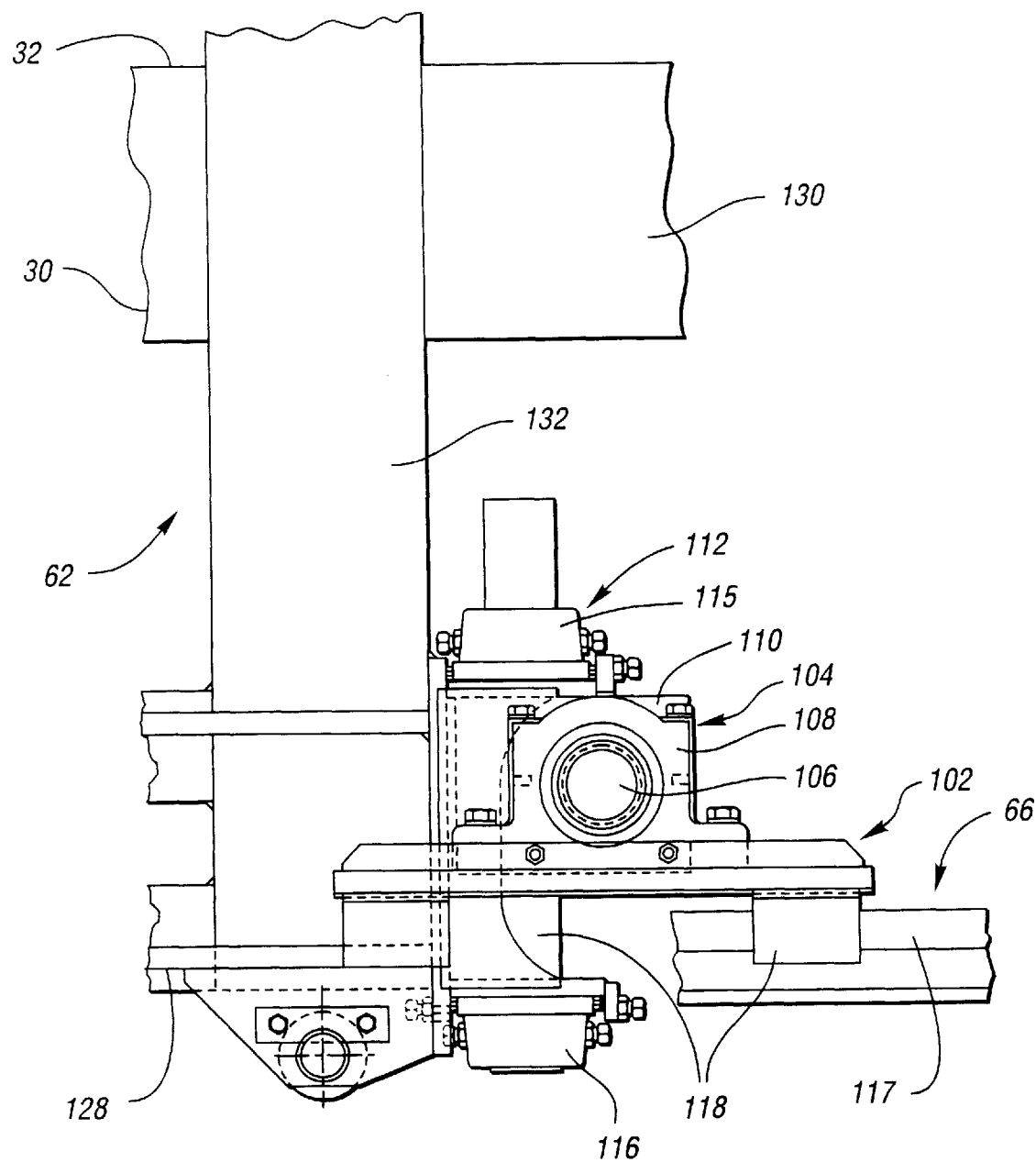
FIG. 4 is an elevational view taken along the direction of line 4—4 in FIG. 3 to further illustrate the construction of the mold frame support assembly.

As best illustrated in FIG. 2, the mold support frame assembly 62 is supported by two pairs of carriages 102 on the track 66. Each carriage 102, as also illustrated by FIGS. 3 and 4, includes a pivotal mount 104 having a shaft 106 supported by a pair of spaced bearings 108 as shown in FIG. 3. Between the bearings 108, a pivotal member 110 is mounted for pivoting about the shaft 106 and hence for pivoting with respect to the carriage 102 supported by the track 66. A slide connection 112 of each pivotal mount 104 provides support of the adjacent corner of the mold support frame assembly 62. More specifically, each slide connection 112 includes a slide shaft 114 mounted in a generally vertical position on the associated pivotal member 110 of the pivotal mount 104. Furthermore, each slide connection 110 includes upper and lower slide connectors 115 and 116 that are fixed on the adjacent corner of the mold support frame assembly 62 and that slidably move upwardly and downwardly on the slide shaft 114.

The construction of the pivotal mounts 104 and slide connections 112 as described above allow the mold support frame assembly 62 to be moved vertically and rotatively by the elevator mechanism 84 with its elevators 86 operated to a different extent by their associated actuators 88 shown in FIGS. 5 and 6 in order to provide the vertical and rotational movement that properly locates the mold 64 carried by the mold support frame assembly. As a result of the rotational component of movement allowed by the slide connections 112, the lower position of the mold support frame assembly is not exactly directly below the upper position but is substantially directly below the upper position.

As illustrated in FIG. 3, the track 66 that supports the carriages 102 includes a pair of track members 117 that receive carriage slides 118. More specifically, as illustrated in FIG. 2, the carriages 102 are arranged in pairs at opposite lateral sides of the system with each pair of carriages movable along an associated pair of the track members 117 of the track 66 to provide the support of the mold support frame assembly 62 whose construction is hereinafter more fully described. These track members 117 thus provide the support of each pair of carriages 102 for horizontal movement to and from the lower position below the topside transfer platen 44 illustrated in FIG. 1 as previously described.

As shown in FIG. 1, a drive member 119 is embodied by a loop that is received by wheels 120 one of which is rotatively driven to move the drive member along the track 66. As shown in FIG. 2, there are actually two of the drive members 119, one at each lateral side of the system, and one carriage 102 at each lateral side of the system includes a connection 121 to the adjacent drive member 119 so as to provide the horizontal movement of the mold support frame assembly 62 along the track. Each connection 121 clamps ends of the associated drive member 119 to form its loop construction. Since the other carriage 102 at each lateral side of the system is free of the drive member 119, these carriages are free to move along the track 66 to accommodate for the rotational component of movement of the mold support frame assembly as it is moved between the upper and lower positions shown by FIGS. 5 and 6 as previously described.

As best illustrated in FIG. 2, the mold support frame assembly 62 includes a pair of mold support frames 124 that are spaced laterally with respect to each other adjacent each lateral side of the forming system. In addition, the mold support frame assembly also includes a connector 126 that extends between the pair of mold support frames 124 and cooperates therewith to provide a thermally stable center as is hereinafter more fully described.

As illustrated in FIGS. 1–6, each mold support frame 124 includes a base 128 that is located below the system housing floor 130, so as to thus be located externally of the heated chamber of the system, and is supported by the elevator mechanism 84. As shown in FIG. 2, each mold support frame 124 includes a pair of legs 132 that extend as shown in FIG. 3 into the system heated chamber 32 through an associated slot 134 in the floor 130. These legs extend in a spaced relationship from each other generally in association with adjacent corners of the mold support frame assembly 62 as shown in FIG. 2. Each mold support frame 124 also includes a mold positioning member 136 extending between and supported by the pair of legs 132 within the heated chamber 32. Each mold positioning member 136 has a mold centering location 138 between the pair of legs 132.

Figure 7:
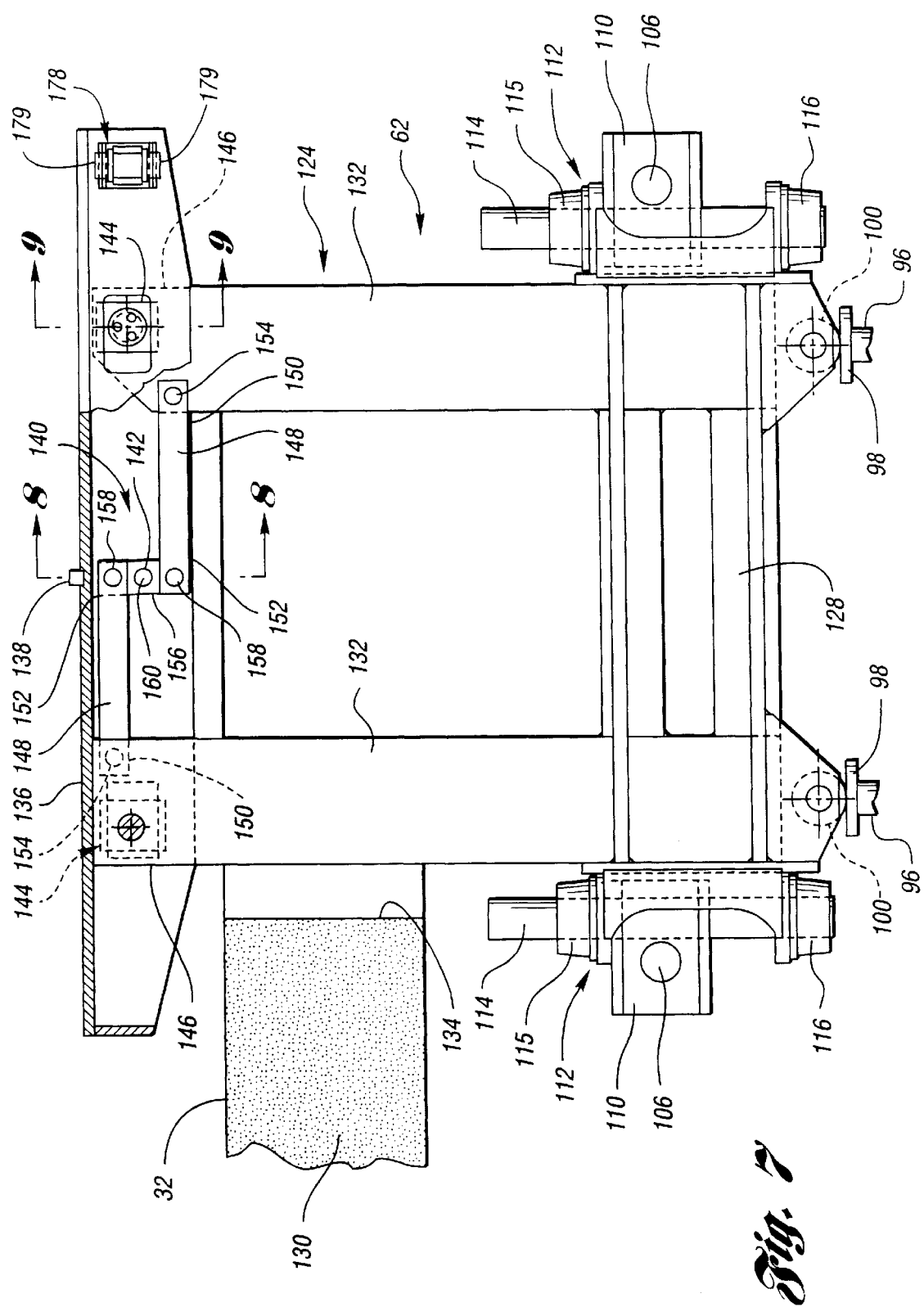
FIG. 7 is a side view of the mold support frame assembly but partially broken away to illustrate a linkage that accommodates for thermal expansion.

As illustrated best in FIG. 7, each mold support frame 124 includes a linkage 140 extending between the pair of legs 132 and having a connection 142 to the associated mold positioning member 136 at the centering location 138 such that thermal expansion and contraction of the mold positioning member upon heating and cooling takes place with the mold centering location remaining generally stationary with respect to the base 128. Thus, upon heating, the linkage 140 ensures that the thermal expansion of the mold positioning member 136 takes place in opposite directions about the mold centering location 138 which remains generally stationary with respect to the base 128 that is located externally of the heated chamber 32 and thereby ensures that the mold on which the forming is provided will be accurately located.

Figure 9:
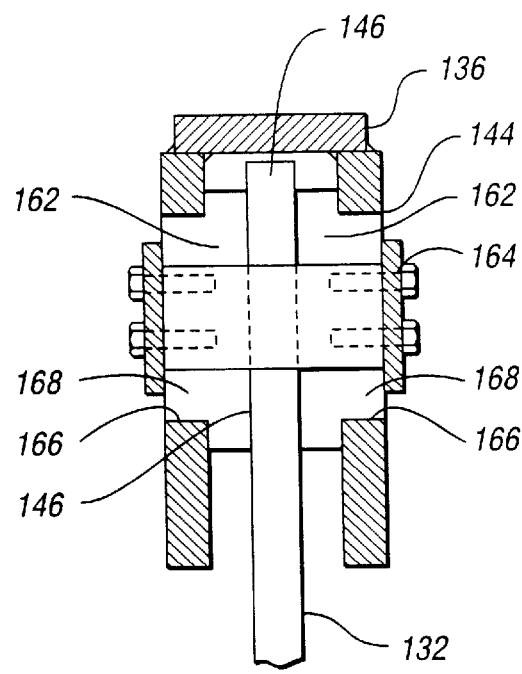
FIG. 9 is a view taken along the direction of line 9—9 in FIG. 7 through the mold support frame assembly at a slide connection thereof to an associated frame leg.

As illustrated by FIGS. 7 and 9, each mold support frame 124 includes a pair of slide connections 144 that mount the mold positioning member 136 on the pair of legs 132. More specifically, the pair of legs 132 extend upwardly from the associated base 128 through the floor slot 134 and have upper ends 146 at which the slide connections 144 mount the mold positioning member 136.

Figure 8:
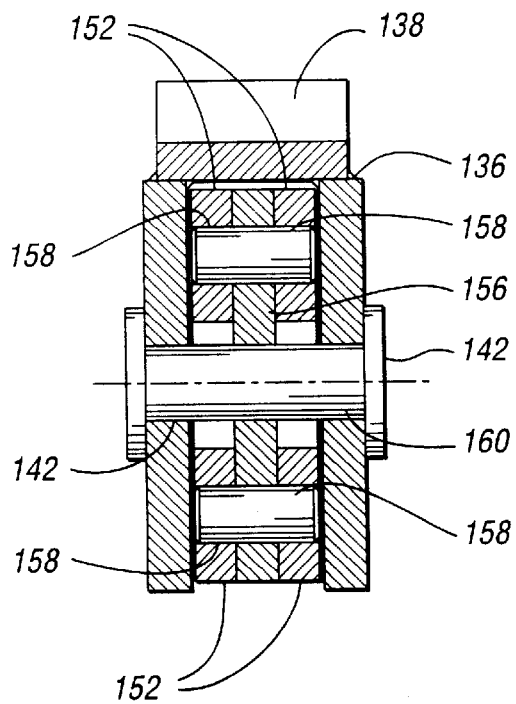
FIG. 8 is a sectional view taken along the direction of line 8—8 in FIG. 7 through the mold support frame assembly and the linkage.

As illustrated in FIGS. 7, 8 and 9, each mold positioning member 136 has an inverted U shape that receives the upper ends 146 of the pair of legs 132 and also receives the linkage 140 extending between the pair of legs. As best illustrated in FIG. 7, the linkage 140 includes a pair of connecting links 148 each of which has an outer end 150 and an inner end 152. A pair of connections 154 respectively secure the outer ends 150 of the connecting links 148 to the legs 132 at their upper ends 146. The linkage 140 also includes a center link 156 having a pair of connections 158 providing securement thereof to the inner ends 152 of the pair of connecting links 148. Furthermore, the connection 142 of the linkage 140 to the mold positioning member 136 is a pivotal connection including a pivotal pin 160 that supports the center link 156 adjacent the mold centering location 138 on the mold positioning member 136. As illustrated, the connecting links 148 have the same length as each other and the pivotal connection 142 that supports the center link 156 on the mold positioning member 136 is located midway between the pair of connections 158 providing the securement of the center link to the inner ends 152 of the connecting links.

It should be appreciated that the connecting links 148 can have different lengths so long as the relative distances between the center link connection 160 and the connections 158 are also correspondingly adjusted so that the expansion takes place about the mold center location 138. Nevertheless, it is preferable for the connecting links 148 to have the same length to facilitate manufacturing.

With reference to FIG. 8, the connection 142 provided by the pin 160 has a horizontal axis of pivoting. Furthermore, the connections 154 of the outer ends 150 of the connecting links 148 to the upper ends 146 of the pair of legs 132 are also pivotal connections that have horizontal axes of pivoting. Likewise, as illustrated in both FIGS. 7 and 8, the connections 158 of the inner ends 152 of the connecting links 148 to the center link 156 also are pivotal connections having horizontal axes of pivoting.

With reference to FIG. 9, each of the slide connections 144 includes a pair of slide members 162 that are secured to each other by a bolted clamp assembly 164 with the upper end 146 of the associated leg 132 clamped therebetween within the downwardly opening U shape of the mold positioning member 136. This downwardly opening U shape of the mold positioning member 136 has a pair of slots 166 that slidably receive slide portions 168 of the slide members 162 in order to permit sliding movement of the mold positioning member with respect to each leg 132 upon thermal expansion and contraction under the control of the linkage 140 previously described in connection with FIG. 7.

With reference to FIG. 2, the connector 126 that extends between the pair of mold support frames 124 is also illustrated in FIGS. 11 and 12 and includes a second mold positioning member 168. This second mold positioning member 168 extends between the pair of mold support frames 124 and has a second mold centering location 170 that, in combination with the mold centering locations 138, provides a thermally stable mold center 172 as illustrated in FIG. 2. A second linkage 174 as illustrated best in FIG. 11 extends between the pair of mold support frames 124 and has a connection 176 (FIG. 10) to the second mold positioning member 168 adjacent its second mold centering location 170 such that thermal expansion and contraction of the second mold positioning member upon heating and cooling takes place with the second mold centering location remaining generally stationary with respect to the bases 128 of the pair of mold support frames 124 illustrated in FIG. 2.

As shown in FIG. 12 and as also illustrated in FIG. 7, a second pair of slide connections 178 support the second mold positioning member 168 on the pair of mold support frames 124. More specifically, the second pair of slide connections 178 respectively support the opposite ends of the second mold positioning member 168 on the mold positioning members 136 of the pair of mold support frames 124. Each of the slide connections 178 includes upper and lower pairs of rollers 179 mounted on the mold positioning member 136 of the associated mold support frame 124 to support the adjacent end of the second mold positioning member 168 while permitting movement therebetween to accommodate for thermal expansion and contraction.

As previously described, the pair of legs 132 of each of the pair of mold support frames 124 illustrated in FIG. 2 extend upwardly from the base 128 thereof with their upper ends 146 supporting the mold positioning member 136 of the mold support frame by the pair of slide connections 144 previously described. Thus, the slide connections 144 cooperating with the linkages 140 of the pair of mold support frames and the slide connections 178 cooperating with the second linkage 174 provide the thermally stable mold center 172 as previously discussed in connection with FIG. 2. While each mold positioning member 136 of the pair of mold support frames 124 has its inverted U shape receiving the upper ends of the legs 132 and the linkage 140, the second linkage 174 is located generally externally of the second mold positioning member 166 as shown best in FIG. 11.

With reference to FIG. 11, the second linkage 174 includes a pair of connecting links 180 each of which has an outer end 182 and an inner end 184. A pair of connections 186 respectively secure the outer ends 182 of the pair of connecting links 180 to the pair of mold support frames 124. The second linkage 174 also includes a center link 188 having a pair of connections 190 providing securement thereof to the inner ends 184 of the pair of connecting links 180. The connection 176 of the second linkage 174 as illustrated in FIG. 10 is a pivotal connection that pivotally supports the center link 188 on the second mold positioning member 168 adjacent its mold centering location 170.

The second linkage 174, like the first linkage previously described has its connecting links 180 preferably provided with the same length as each other and the pivotal connection 176 (FIG. 10) that supports the center link 188 on the second mold positioning member 168 is located midway between the pair of connections 190 (FIG. 11) providing securement of the center link of the second linkage to the inner ends 184 of its pair of connecting links 180. As previously discussed in connection with the first linkage, it is also possible for the connecting links 180 to have different lengths than each other so long as the location of the pivotal connection 176 (FIG. 10) is adjusted with respect to the connections 190 so that the thermal expansion and contraction maintains the second mold centering location 170 stationary with respect to the bases of the pair of mold support frames as previously described.

Figure 10:
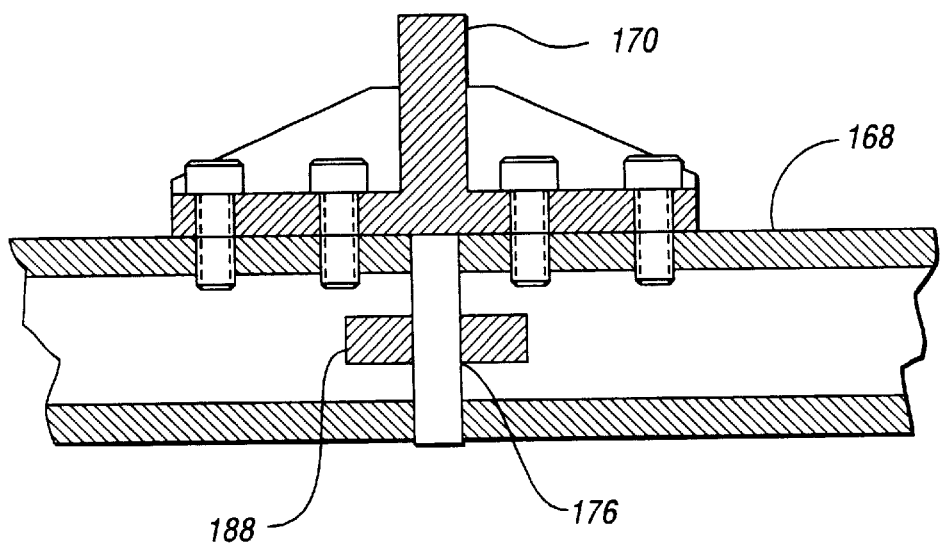
FIG. 10 is a sectional view taken along the direction of line 10—10 in FIG. 2 through the mold support frame assembly and a second linkage that accommodates for thermal expansion.

As illustrated in FIG. 10, the pivotal connection 176 that supports the center link 188 of the second linkage on the second mold positioning member 168 has a vertical axis of pivoting. Furthermore, the pair of connections 186 of the outer ends 182 of the connecting links 180 of the second linkage 174 and the pair of connections 190 of the inner ends 184 of the connecting links of the second linkage are pivotal connections that also have vertical axes of pivoting. Additionally, both of the connecting links 180 are located externally of the second positioning member 168 with the centering link 188 extending therethrough generally intermediate its ends where the slide connections 178 provide the support thereof on the mold positioning members 136 of the pair of mold support frames 124.

While the best mode for carrying out the invention has been described in detail, those familiar with the art to which this invention relates will recognize various alternative designs and embodiments for carrying out the invention as defined by the following claims.

What is claimed is:

1. Glass sheet forming apparatus, comprising:
   a topside transfer platen having a downwardly facing surface for receiving a heated glass sheet to be formed;
   a mold support frame assembly for supporting a mold for translational and rotational movement between an upper position adjacent the downwardly facing surface of the topside transfer platen to receive the heated glass sheet therefrom for forming and a lower position where the glass sheet is positioned below the topside transfer platen and has a different orientation due to the rotational component of the movement; and a track for supporting the mold support frame assembly for horizontal movement to and from the lower position below the topside transfer platen.

2. Glass sheet forming apparatus as in claim 1 wherein the mold support frame assembly moves the mold vertically and rotatively between the upper position and the lower position which is substantially directly below the upper position.

3. Glass sheet forming apparatus as in claim 2 which includes an elevator mechanism that moves the mold support frame assembly vertically and rotatively between the upper and lower positions.

4. Glass sheet forming apparatus as in claim 3 wherein the elevator mechanism includes a pair of elevators that move the mold support frame assembly vertically, and a pair of actuators that respectively operate the pair of elevators to provide vertical movement thereof for different extents in order to provide the vertical and rotational movement of the mold support frame assembly.

5. Glass sheet forming apparatus as in claim 4 further including a pair of crank arm linkages that respectively connect the pair of actuators to the pair of elevators to provide the vertical movement thereof that moves the mold support frame assembly.

6. Glass sheet forming apparatus as in claim 5 further including rollers that support the mold support frame assembly on the pair of elevators.

7. Glass sheet forming apparatus as in claim 4 further including a pair of carriages, a pair of pivotal mounts respectively supported by the pair of carriages, and the pair of pivotal mounts each having a slide connection to the mold support frame assembly.

8. Glass sheet forming apparatus as in claim 7 wherein the track includes a pair of track members that support the pair of carriages for horizontal movement to and from the lower position below the topside transfer platen.

9. Glass sheet forming apparatus as in claim 7 further including a drive member movable along the track and having a connection to one of the carriages for providing movement thereof and of the mold support frame assembly horizontally along the track.

10. Glass sheet forming apparatus, comprising:

a topside transfer platen having a downwardly facing surface for receiving a heated glass sheet to be formed;

a mold support frame assembly for supporting a mold;

an elevator mechanism including a pair of elevators that move the mold support frame assembly vertically and also including a pair of actuators that respectively operate the pair of elevators for different extents to provide translational and rotational movement of the mold support frame assembly between an upper position adjacent the downwardly facing surface of the topside transfer platen to receive the heated glass sheet therefrom for forming and a lower position where the glass sheet is positioned below the topside transfer platen and has a different orientation due to the rotational component of the movement; and a track for supporting the mold support frame assembly for horizontal movement to and from the lower position below the topside transfer platen.

11. Glass sheet forming apparatus, comprising:

a topside transfer platen having a downwardly facing surface for receiving a heated glass sheet to be formed;

a mold support frame assembly for supporting a mold;

an elevator mechanism including a pair of elevators that move the mold support frame assembly vertically and also including a pair of actuators that respectively operate the pair of elevators for different extents to provide translational and rotational movement of the mold support frame assembly between an upper position adjacent the downwardly facing surface of the topside transfer platen to receive the heated glass sheet therefrom for forming and a lower position where the glass sheet is positioned below the topside transfer platen and has a different orientation due to the rotational component of the movement;

a pair of carriages and a pair of pivotal mounts respectively supported by the pair of carriages, and the pair of pivotal mounts each having a slide connection to the mold support frame assembly;

a track for supporting the mold support frame assembly for horizontal movement to and from the lower position below the topside transfer platen; and a drive member movable along the track and having a connection to one of the carriages for providing movement thereof and of the mold support frame assembly horizontally along the track.

12. A method for transferring a hot glass sheet during a forming operation, comprising:

releasing a hot glass sheet from a downwardly facing topside transfer platen onto a mold positioned in an upper position adjacent the topside transfer platen;

moving the mold downwardly by translational and rotational movement to a lower position below the topside transfer platen where the hot glass sheet has a different orientation due to the rotational component of the movement; and thereafter moving the mold horizontally from the lower position below the topside transfer platen.

13. A method for transferring a hot glass sheet as in claim 12 wherein the mold is initially moved horizontally to the lower position below the topside transfer platen and is then moved upwardly by translational and rotational movement to the upper position to receive the hot glass sheet from the topside transfer platen.

14. A method for transferring a hot glass sheet as in claim 13 wherein the mold is supported on a track by a mold support frame assembly for the horizontal movement to and from the lower position below the topside transfer platen.

15. A method for transferring a hot glass sheet during a forming operation, comprising:

moving a mold horizontally to a lower position below a downwardly facing topside transfer platen;

moving the mold upwardly by translational and rotational movement to an upper position adjacent the downwardly facing topside transfer platen where the mold has a different orientation than in the lower position due to the rotational component of the movement;

releasing a hot glass sheet from the downwardly facing topside transfer platen onto the mold in the upper position;

moving the mold downwardly by translational and rotational movement back to the lower position below the topside transfer platen; and moving the mold horizontally from the lower position below the topside transfer platen.

* * * * *